United States Patent [19]

Baslow

[11] 4,161,977
[45] Jul. 24, 1979

[54] FRAME ASSEMBLY FOR MOUNTING FABRIC SHEETS

[76] Inventor: Floyd Baslow, 100 Lafayette St., New Bethlehem, Pa. 16242

[21] Appl. No.: 834,472

[22] Filed: Sep. 19, 1977

Related U.S. Application Data

[63] Continuation-in-part of Ser. No. 728,285, Sep. 30, 1976, Pat. No. 4,053,008.

[51] Int. Cl.$^2$ ............................................. A47G 1/10
[52] U.S. Cl. ................................. 160/381; 160/327; 160/374.1; 403/401; 403/231
[58] Field of Search ................... 40/156, 152, 152.1, 40/603; 403/401, 402, 231; 52/586, 475, 656, 222, 273; 5/353.2, 353.3, 353.1; 160/374.1, 327, 381, 391, 392, 394

[56] References Cited

U.S. PATENT DOCUMENTS

| | | | |
|---|---|---|---|
| 2,924,858 | 2/1960 | Couse et al. | 52/586 |
| 3,757,479 | 9/1973 | Martinez | 52/656 |
| 3,885,335 | 5/1975 | Egermayer | 40/603 |
| 4,018,260 | 4/1977 | Baslow | 160/374.1 |
| 4,053,008 | 11/1977 | Baslow | 52/273 |

FOREIGN PATENT DOCUMENTS 2339501  8/1977  France ..................................... 160/392

Primary Examiner—James L. Ridgill, Jr.
Attorney, Agent, or Firm—Michael Ebert

[57] ABSTRACT

A frame assembly for mounting and displaying a sheet of decorative fabric. The assembly is constituted by a set of four mitered pieces joined together at their corners by reinforcing snap-in elements to form a frame whose dimensions fall somewhat short of the sheet dimensions to an extent equal to the margins of the fabric sheet. Each frame piece is formed by an extruded molding having resilient inlet jaws which lie adjacent to the junction of the outer edge and the back of the molding and communicates with an internal storage channel running the full length of the molding. Also running the full length of the molding on the front face thereof is a band of pressure-sensitive adhesive having a peel-off cover. Formed in the back is a longitudinally-extending keyway. Each snap-in element has a right angle triangle formation with a triangular well that fits within the mitered corner at the rear to define right angle shoulders that overlie the corner, the shoulders being provided with splines projecting therefrom that snap into the keyways of the pieces forming the corner. To mount the fabric sheet over the frame, the ends of the sheet are secured to the adhesive bands and the margins thereof are forced through the inlet jaws into the storage channels.

11 Claims, 7 Drawing Figures

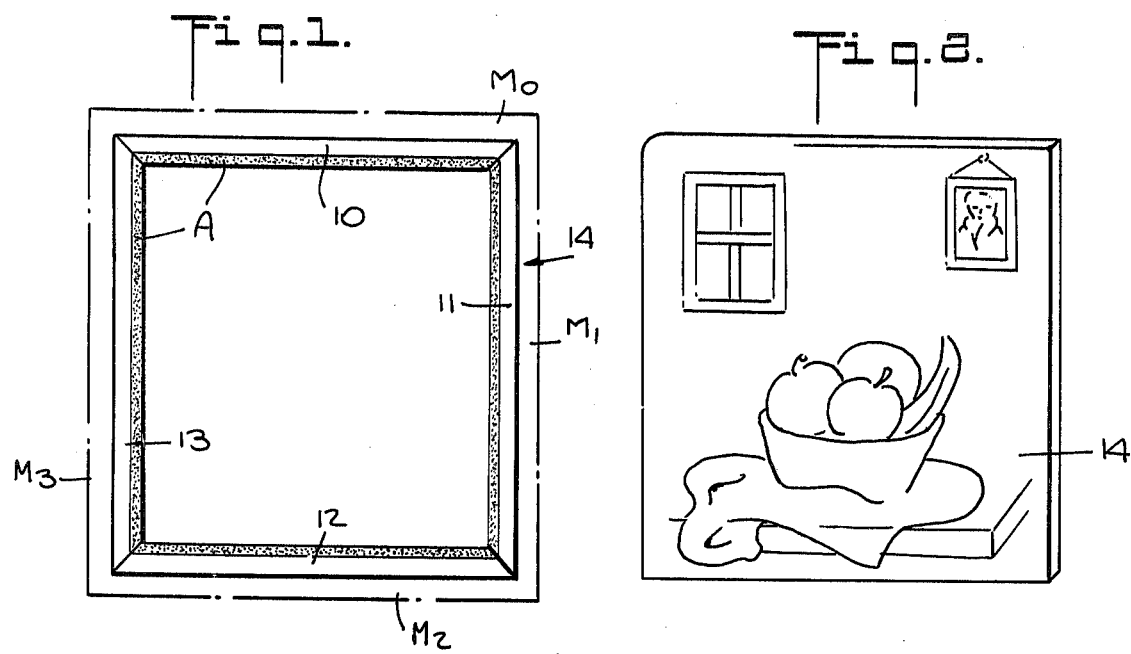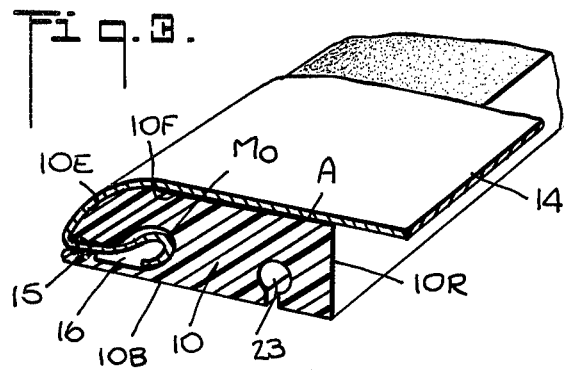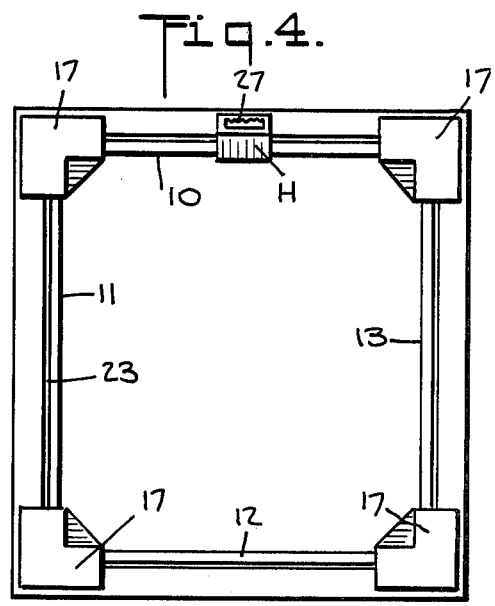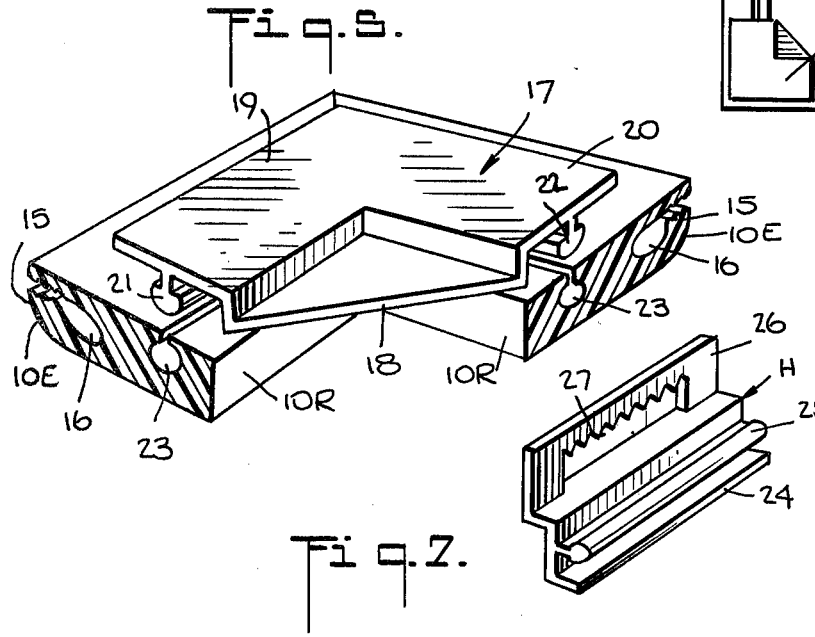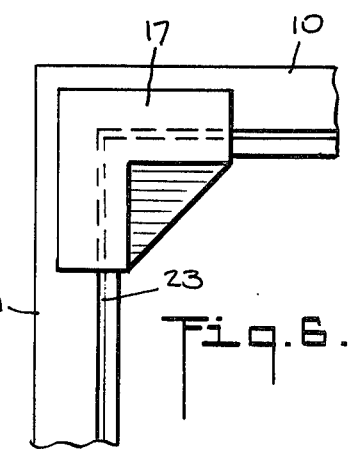

FRAME ASSEMBLY FOR MOUNTING FABRIC SHEETS

RELATED APPLICATION

This application is a continuation-in-part of my co-pending application Ser. No. 728,285, filed Sept. 30, 1976, now U.S. Pat. No. 4,053,008 issued Oct. 11, 1977 entitled "Support Molding for Fabric Wall Coverings."

BACKGROUND OF INVENTION

This invention relates generally to frames for mounting and displaying decorative fabric sheets, and more particularly to a frame assembly constituted by mitered pieces of extruded molding whose corners are joined together by snap-in elements, the pieces having internal storage channels which are accessible through inlet jaws that receive the margins of the sheet.

The field of decorative textiles has a long history. Thus ancient Chinese tapestries (K'o ssu) were made of light, thin silk, often interwoven with gold thread. In traditional tapestries, the design or picture is woven into the body of the fabric. The modern practice in creating decorative fabrics of linen, silk or any other textile yarn is to use silk-screen printing techniques.

In displaying a decorative fabric material such as a needlepoint fabric, one is usually faced with a mounting problem; for while one can freely suspend the fabric from a wall molding, this usually results in creases and folds that are aesthetically displeasing. It is therefore the present practice to mount the fabric under tension over a stretcher frame whereby the mounted fabric may then be placed and displayed at any desired site on a wall. It is important that the stretcher frame be adequately reinforced; for any warpage of the frame will be reflected in the fabric.

The present practice requires a fair degree of professional skill, for one must construct a reinforced stretcher frame in dimensions appropriate to the size of the fabric sheet to be mounted and then carefully attach the margins of the fabric to the frame pieces. This is no simple matter; for not only is it necessary to hammer in tacks or staples at closely spaced points along the frame pieces, but one must exercise care in seeing to it that the fabric is under uniform tension, for otherwise the decorative pattern or picture printed or otherwise created on the fabric surface will be distorted.

Hence it has heretofore not been possible for the ordinary householder or do-it-yourself worker of limited skill to successfully mount fabric sheets.

SUMMARY OF INVENTION

In view of the foregoing, it is the main object of this invention to provide a simple, low-cost frame assembly for mounting and displaying fabric sheets without the need for professional skills or an expensive frame structure.

A significant feature of the invention is that the molding pieces which make up the frame may be mass-produced in stock sizes and thereafter miter cut to any size to accommodate a large range of decorative fabric sheet sizes, the pieces being joined together at their corners by snap-in elements whereby virtually no skill is required to produce the frame. Alternatively, since the exact size of a frame in accordance with the invention is not critical, one may produce stock pieces in a range of progressive sizes so that the customer can set up a desired frame configuration without having to actually cut the pieces to size.

An important aspect of the invention resides in the fact that the fabric sheet need not be tacked or otherwise attached to the frame pieces; for in mounting the fabric sheet, all that is necessary is to secure the ends of the sheet onto adhesive bands on the front face of the molding pieces to stuff the margins thereof through inlet jaws leading into storage channels, the jaws retaining the margins and holding the fabric sheet on the frame.

Yet another object of this invention is to provide a frame assembly constituted by a set of four mitered frame pieces, corner snap-in elements and a hanger snap, making it possible to suspend the frame from a wall without the need for wires or other expedients usually required for this purpose.

Briefly stated, these objects are attained in a frame assembly constituted by a set of four mitered pieces joined together at their corners by reinforcing snap-in elements to form a rectangular frame whose dimensions fall somewhat short of the fabric sheet dimensions to an extent equal to the margins of the sheet. The term "margin" as used herein does not refer to a selvage or any other predetermined end portion of the fabric, but only to so much of the fabric end as is necessary to effect mounting in a frame piece of the present type.

Each frame piece is formed by a molded extrusion of synthetic plastic material or metal, such as aluminum, with similar resilient characteristics, having inlet jaws which lie adjacent the junction of the outer edge and the back of the molding and communicate with an internal storage channel running the full length of the molding. Also running the full length of the molding on the front face thereof is a band of pressure-sensitive adhesive having a peel-off cover thereon. Formed in the base of the molding is a longitudinally-extending keyway. Each snap-in element has a right angle triangle formation with a triangular well that fits within and reinforces the mitered corner at the rear thereof to define right angle shoulders that overlie the corner, the shoulders having splines projecting therefrom that snap into the keyway.

To mount the fabric sheet over the reinforced frame, the covers are removed from the adhesive bands, the ends of the sheet are secured to the bands and the margins thereof are forced through the inlet jaws into the storage channels, the jaws clamping on the margins to hold the sheet onto the frame.

Also provided is a hanger snap having a shelf that fits under the top panel piece and a spline that snaps into the keyway, the snap being provided with an offset extension having a serrated opening to facilitate hanging of the frame.

OUTLINE OF DRAWINGS

For a better understanding of the invention as well as other objects and further features thereof, reference is made to the following detailed description to be read in conjunction with the accompanying drawings, wherein:

FIG. 1 is a front view of a frame assembly in accordance with the invention which is adapted to mount a fabric sheet. The sheet is indicated by dotted lines, to show the relative dimensions of the frame and the sheet;

FIG. 2 is a perspective view of the mounted fabric sheet;

FIG. 3 is an end view of one of the frame pieces;

FIG. 4 is a rear view of the frame assembly;

FIG. 5 is a perspective view of one of the snap-in corner elements;

FIG. 6 is a plan view of the corner element; and

FIG. 7 is a perspective view of a hanger snap.

DESCRIPTION OF INVENTION

Referring now to FIGS. 1 and 2, there is shown a frame assembly in accordance with the invention including four mitered pieces 10, 11, 12 and 13, joined together at their corners to form a rectangular frame for mounting a decorative fabric sheet 14. It will be seen that the dimensions of the frame fall somewhat short of that of the sheet to an extent equal to the margins $M_0$, $M_1$, $M_2$ and $M_3$ on the ends of the sheet.

The nature of the frame is such as to provide storage channels to receive and retain margins $M_0$, $M_1$, $M_2$ and $M_3$. When these margins are stuffed into the storage channels, the fabric sheet smoothly covers the frame to provide a mounted decorative fabric which conceals the frame, as shown in FIG. 2.

The frame pieces are extruded moldings formed of high strength, rigid plastic material such as polypropylene, PVC or polyethylene having sufficient resilience to provide the required jaws action or a metal having similar characteristics. Each piece, as illustrated in connection with top piece 10 in FIG. 3, has a back or base 10B, a front face 10F, a rear edge 10R and a front edge 10E. Front edge 10E in the example shown is chamfered to avoid a sharp edge. Formed at the junction of base 10R and a front edge 10E are inlet jaws 15 whose surfaces may be serrated to provide a gripping action, the jaws communicating with an internal storage channel 16 running the full length of the piece. Also running the full length of the piece along front face 10F thereof is a band of pressure-sensitive adhesive material A having a removable protective cover. In practice, band A may be a commercially-available, double-faced adhesive tape with peel-off covers, the under face being adhered to the piece and the outer face being exposed when its cover is removed.

The jaws are normally almost closed. Because of the nature of the plastic material, the jaws are resilient and hence may be dilated to admit margin $M_0$ of the fabric sheet which is stuffed into storage channel 16. This insertion is best effected by a suitable insertion tool which in practice may be similar to a broad putty knife having a blunt edge adapted to engage the margin and to force it through the jaws.

The size of the frame is not critical; but it must be of a size relative to the fabric sheet to provide for an adequate fabric margin. Since the storage channel can receive broad or narrow margins within certain limits, one need not cut the pieces to an exact frame dimension, for the frame can accommodate limited variations in sheet sizes.

The four pieces 10 to 12 are joined together at their corners at the rear of the frame by reinforcing snap-in elements 17, as shown in FIGS. 4, 5 and 6. These elements may be molded of the same material as that of the frame pieces or they may be made of aluminum or other suitable material. Each element, as best seen in FIG. 5, has a right angle triangle formation and includes a triangular depression or well 18 that fits neatly within a frame corner at the rear to define right angle banks or shoulders 19 and 20 which overlie the mitered pieces to be joined.

Projecting below shoulders 19 and 20 are splines 21 and 22 which snap into keyways 23 extending longitudinally along the back of the frame pieces. Thus to join the pieces at any corner, one need merely place a snap-in element thereover and press it into position. To disassemble the frame, one has merely to force out the corner elements.

Triangular well 18 serves as a reinforcing corner strut to rigidify the frame without adding substantially to the weight thereof. When the four margins of the fabric are stuffed into the corresponding storage channels of the four pieces, the outer edges 10E of the frame pieces are covered up to the point of base 10R. Thus when suspended on a wall, the frame is fully concealed by the fabric sheet mounted thereover.

There is no need for a picture wire to suspend the frame from a wall hook, for suspension is effected by a hanger snap H, as shown in FIGS. 7 and 8. The snap is provided with a shelf 24 which is received under upper piece 10 of the frame, a spline 25 which snaps into keyway 23, and an offset extension 26 which is provided with a serrated opening 27 to receive a nail or hook.

The frame pieces may be made in long stock sizes and then miter-cut to the dimensions necessary for a given frame. Or pre-cut pieces in a range of progressive sizes may be provided so that a purchaser can obtain a set of four pieces which closely approximates the desired frame dimensions. As pointed out previously, the frame dimensions are not critical, and as long as they are somewhat smaller than the dimensions of the fabric sheet to allow for adequate fabric margins, the frame is acceptable for mounting the fabric sheet.

In mounting a fabric sheet on the assembled frame, one first peels off the protective covers from adhesive bands A to expose the adhesive. One then presses down the center zone of the upper end of the fabric sheet to the exposed adhesive band at upper piece 10 of the frame. With the fabric sheet so anchored, one then gently stretches the fabric before securing the corresponding center zone at the lower end of the fabric sheet to the exposed adhesive band at the lower frame piece 12. This adhesive mounting operation of the fabric sheet is repeated for the right and left pieces 11 and 13 so that the four ends of the fabric with the proper amount of tension therein is secured to the frame at the compass points before the remaining portion of the fabric sheet is secured to the bands A.

After the fabric sheet ends are properly anchored to the front face of the frame by the adhesive bands A with sufficient tension to afford a smooth, wrinkle-free fabric surface stretched thereacross, the margins are then stuffed into the storage channels, the jaws of the pieces firmly gripping the margins.

While there has been shown and described a preferred embodiment of a frame assembly for mounting fabric sheets in accordance with the invention, it will be appreciated that many changes and modifications may be made therein without, however, departing from the essential spirit thereof.

I claim:

1. A frame assembly for mounting and displaying a sheet of decorative fabric material having predetermined dimensions, said assembly comprising a set of four mitered pieces, and coupling elements joining said pieces together at their mitered corners at the rear to form a rectangular frame whose dimensions fall somewhat short of the sheet dimensions to an extent equal to the margins of the sheet, each frame piece having inlet jaws which lie adjacent the junction of the outer edge and the back thereof and communicate with an internal storage channel running the full length of the piece, each piece also having a pressure-sensitive adhesive band on the front face running the full length thereof to secure the ends of the sheet to the frame, the margins of the sheet ends being insertable into the channels of said pieces through said inlet jaws which clamp onto said margins to maintain the sheet supported thereby in smooth condition.

2. A frame assembly as set forth in claim 1, wherein said pieces have a chamfered outer edge to cause said sheet ends to curve toward said inlet jaws.

3. A frame assembly as set forth in claim 1, further including a flat blade tool to engage and effect insertion of said margins into said jaws.

4. A frame assembly as set forth in claim 1, wherein said pieces are made of metal.

5. An assembly as set forth in claim 1, wherein said band is provided with a peel-off protective cover.

6. A frame protective cover assembly as set forth in claim 1, wherein said piece is formed from a molded extrusion of synthetic plastic material.

7. A frame assembly as set forth in claim 1, wherein the back of said piece has a longitudinally-extending keyway formed therein, and said coupling elements are provided with splines which snap into the keyways of the pieces forming the mitered corner.

8. A frame assembly as set forth in claim 7, wherein said coupling element has a triangular formation with a triangular well that fits into and reinforces the associated mitered corner at the rear thereof to define right angle shoulders that overlie the corner, said splines projecting from these shoulders.

9. A frame assembly as set forth in claim 7, further including a hanger snap having a spline that snaps into the keyway of the top piece of the frame.

10. A frame assembly as set forth in claim 7, wherein said hanger snap includes a shelf that fits under the top piece.

11. A frame assembly as set forth in claim 10, wherein said hanger snap is provided with an offset extension having a serrated opening to facilitate hanging.

* * * * *

UNITED STATES PATENT OFFICE
CERTIFICATE OF CORRECTION

Patent No. 4,161,977      Dated JULY 24, 1979

Inventor(s) FLOYD BASLOW

It is certified that error appears in the above-identified patent and that said Letters Patent are hereby corrected as shown below:

CLAIM 10 "7" SHOULD HAVE READ -- 9 --

Signed and Sealed this

Twenty-third Day of October 1979

[SEAL]

Attest:

RUTH C. MASON
*Attesting Officer*

LUTRELLE F. PARKER
*Acting Commissioner of Patents and Trademarks*